July 29, 1941.     J. VINCENT     2,251,087
SPEED REGULATOR
Filed Aug. 7, 1940
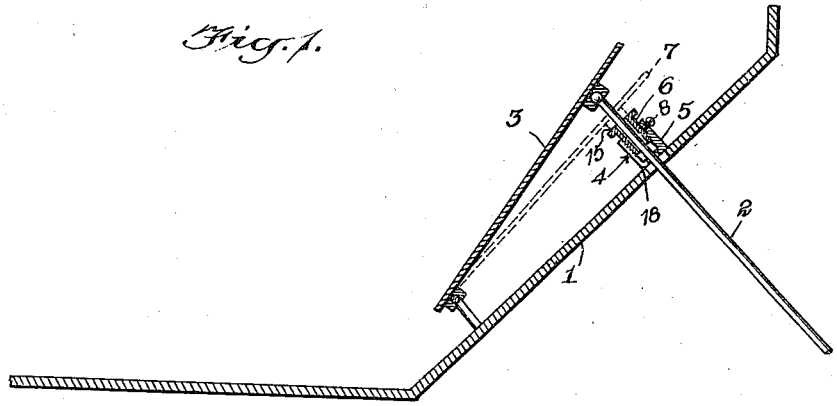
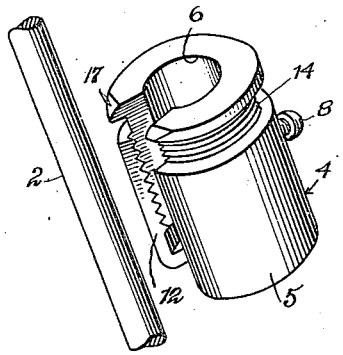
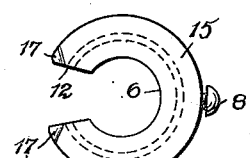
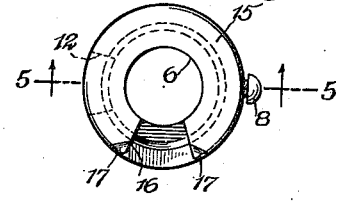
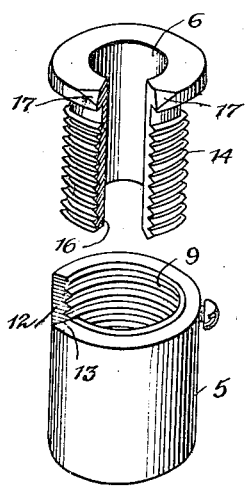
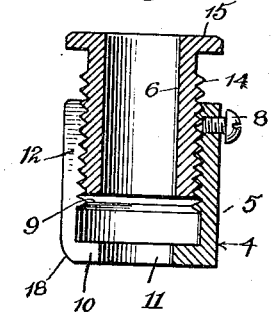
WITNESSES
INVENTOR
James Vincent
BY
Munn, Anderson & Liddy
ATTORNEYS Patented July 29, 1941

2,251,087

UNITED STATES PATENT OFFICE 2,251,087

SPEED REGULATOR

James Vincent, North Bergen, N. J.

Application August 7, 1940, Serial No. 351,655

7 Claims. (Cl. 74—526)

This invention relates to speed regulators for automobiles and has for an object to provide an improved construction which will regulate the amount of gasoline fed to the engine and thereby determine the speed of the automobile.

Another object of the invention is to provide a device which may be easily applied or removed and which is adapted when in use to surround the accelerator rod and limit its downward movement so as to limit the amount of acceleration given the engine.

An additional and more specific object of the invention is to provide a regulator formed of a pair of tubular adjustable members and means for locking the same in various adjusted positions with the parts so formed as to be readily applied to the accelerator rod between the floor board of an automobile and the accelerator pedal.

In the accompanying drawing—

Fig. 1 is a sectional view through part of an automobile illustrating part of an accelerator rod and accelerator pedal together with an embodiment of the invention shown in operative position;

Fig. 2 is a perspective view of a speed regulator embodying the invention ready to be applied to the accelerator rod;

Fig. 3 is a top plan view of the speed regulator shown in Fig. 2;

Fig. 4 is a view similar to Fig. 2 but showing one of the tubular elements rotated for approximately a quarter turn;

Fig. 5 is a sectional view through Fig. 4 approximately on the line 5—5;

Fig. 6 is a perspective view of the inner tubular member shown in Fig. 2;

Fig. 7 is a perspective view of the outer tubular member shown in Fig. 2.

Referring to the accompanying drawing by numerals, 1 indicates the floor board of an automobile which is of standard structure. The accelerator rod 2 extends through this floor board and is connected to the accelerator pedal 3 in the usual manner. When it is desired to make the engine operate faster, pedal 3 is pressed down more and more and, consequently, the engine will move faster and faster. If the clutch is engaged the automobile will also move faster and faster as the pedal 3 is depressed. This is the usual action now in common practice.

Where one person is instructing another person how to drive an automobile, sometimes the student presses the accelerator pedal more than desired and this either floods the carbureter or causes the automobile to move at a dangerous speed. To overcome any such tendency on the part of students, a speed regulator embodying the invention may be used so that the student can speed the engine only to a certain extent as determined by a previous setting of the regulator.

The regulator 4, as shown in Fig. 3, may be quickly and easily applied to the accelerator rod 2 or removed therefrom. It is adjusted to allow the pedal 3 to move downwardly a desired distance and may be adjusted either before or after it is applied. As shown in Fig. 1, the regulator 4 has the outer tubular member 5 resting on the floor board 1 and the inner tubular member 6 extending a short distance beyond the outer tubular member 7, whereby the pedal 3 may be moved downwardly until it strikes the outer end of the tubular member 6. These parts may be set so that when the pedal is fully down as indicated by the dotted position 7, the automobile will be traveling say fifteen or twenty miles an hour. After the student has left the car, the old or experienced driver may quickly remove the regulator 4 and then may depress the pedal to any desired extent in the usual way. The regulator 4 not only consists of tubular members 5 and 6, but also includes a locking device 8 which is a set screw for locking the parts against accidental independent movement. In forming the outer tubular member 5 internal threads 9 are provided and also an inturned flange 10 at the lower end of the bottom. An ample opening 11, however, is left so that the rod 2 may loosely slide through the device. A slot 12 extends from top to bottom of the outer tubular member 5 and this slot is formed so that the respective walls 13 will extend radially. The inner tubular member 6 is provided with exterior threads 14 adapted to be screwed into the threads 9 and locked in different adjusted positions by the set screw 8. A radiating flange 15 is provided at the end of member 6. The member 6 is also provided with a slot or notch 16 similar to slot 12. These two slots are brought into register, as shown in Fig. 2, when the device is to be applied to rod 2 or removed therefrom. Preferably the flange 15, at the notch 16, is provided with chamfered corners 17 and also the outer tubular member 5 is rounded or chamfered at 18. This allows the parts to be slid in position in a more efficient manner.

The device may be applied or removed at any time either while the car is in motion or while it is stationary. Also the inner tubular member 6 may be adjusted at any time. After the regulator has been applied to the rod 2, the inner tubular member 6 is rotated for a quarter revolution or some other degree until the two slots are out of registry. The set screw 18 is then tightened. This may be done by the fingers and will hold sufficiently for ordinary purposes. It will be evident that the set screw could be tightened by a screw-driver at any time.

I claim:

1. A speed regulator for automobiles in combination with an accelerator pedal and accelerator rod, a telescoping pair of slotted, tubular members adapted to be removably mounted on said rod so that the rod may extend loosely therethrough for limiting the downward movement of said pedal and rod, means for adjusting said tubular members in different positions in respect to each other and means for locking said members against movement in respect to each other.

2. A speed regulator for automobiles including an interiorly threaded member, a hollow exteriorly threaded member of a size to be screwed into said interiorly threaded member, said members having provision whereby they may be applied sidewise in engagement with a suitable control element, and means carried by said interiorly threaded member for locking said members against movement in respect to each other.

3. A speed regulator for automobiles including a tubular member having interior threads and a slot extending from one end to the other, a second tubular member formed with exterior threads and a slot extending from one end to the other, said members being adapted to be screwed together and a set screw for locking said members against independent rotary movement.

4. A speed regulator for automobiles including an outer tubular member fully open at one end and provided at the opposite end with an inturned flange, said outer tubular member being interiorly threaded from the fully open end toward said flange, said outer tubular member being also provided with a slot extending the full length of the member with the side wall extending radially whereby said slot will flare from the interior of the tubular member to the exterior thereof, an exteriorly threaded tubular member formed to be screwed into the outer tubular member, said exteriorly threaded tubular member having a slot extending from top to bottom and of the same shape as the slot in the outer tubular member, said slots being adapted to be brought into registry when the regulator is being placed in functioning position and when the same is removed and a set screw for locking said members against independent movement.

5. A speed regulator for automobiles as set forth in claim 4, in which the exteriorly threaded member has a radiating flange at one end and forming the flange adjacent the slot has chamfered corners and forming the outer tubular member with chamfered corners adjacent the slot at the inturned flanged end.

6. A device for regulating the axial movement of a control rod, comprising members longitudinally slotted throughout and capable of being placed in axial alinement in engagement with the control rod and through which said rod may slidably extend, and coacting means on said members for making axial adjustments of said members with respect to each other to vary the length of the device.

7. A device for regulating the axial movement of a control rod, comprising members longitudinally slotted throughout capable of being placed in axial alinement and through which said rod may slidably extend, and coacting means on said members for making axial adjustments of said members with respect to each other to vary the length of the device.

JAMES VINCENT.